United States Patent
Wu et al.

(10) Patent No.: US 11,640,062 B2
(45) Date of Patent: May 2, 2023

(54) NEAR-EYE LIGHT FIELD DISPLAY DEVICE

(71) Applicant: Coretronic Corporation, Hsin-Chu (TW)

(72) Inventors: Jui-Yi Wu, Hsin-Chu (TW); Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 151 days.

(21) Appl. No.: 17/134,130

(22) Filed: Dec. 24, 2020

(65) Prior Publication Data

US 2022/0082829 A1    Mar. 17, 2022

(30) Foreign Application Priority Data

Sep. 14, 2020   (CN) .......................... 202010959076.2

(51) Int. Cl.
  *G02B 27/01*   (2006.01)
(52) U.S. Cl.
  CPC .. *G02B 27/0172* (2013.01); *G02B 2027/0118* (2013.01)
(58) Field of Classification Search
  CPC .... G06F 3/012–013; G02B 2027/0118; G02B 27/0172
  See application file for complete search history.

(56) References Cited

U.S. PATENT DOCUMENTS

| 9,557,565 | B2 | 1/2017 | Luebke et al. |
| 2005/0213068 | A1 | 9/2005 | Ishii et al. |
| 2017/0285395 | A1 * | 10/2017 | Minowa ............ G02F 1/133512 |
| 2019/0197714 | A1 | 6/2019 | Pau et al. |
| 2019/0250439 | A1 | 8/2019 | Urey et al. |

(Continued)

FOREIGN PATENT DOCUMENTS

| CN | 103823305 | 9/2016 |
| CN | 107329267 | 11/2017 |

(Continued)

OTHER PUBLICATIONS

"Office Action of Taiwan Counterpart Application", dated May 25, 2021, p. 1-p. 5.

(Continued)

*Primary Examiner* — Hang Lin
(74) *Attorney, Agent, or Firm* — JCIPRNET

(57) ABSTRACT

A near-eye light field display device, including a display element, a micro-lens array, a first shielding element, and a second shielding element, is provided. The display element is configured to provide an image beam. The micro-lens array is located on a transmission path of the image beam. The micro-lens array has multiple micro-lenses connected to each other. The first shielding element is located between the display element and the micro-lens array, and the first shielding element includes multiple first shielding regions. The micro-lens array is located between the first shielding element and the second shielding element. The second shielding element includes multiple second shielding regions. The first shielding regions and the second shielding regions are located on the transmission path of the image beam passing through a junction of the micro-lenses, and a ratio of diameter of the micro-lenses and a lens pitch of the micro-lenses is less than 0.8.

9 Claims, 3 Drawing Sheets

(56) References Cited

U.S. PATENT DOCUMENTS

2019/0265477 A1 8/2019 Perreault et al.
2019/0297234 A1 9/2019 Nagahama et al.

FOREIGN PATENT DOCUMENTS

| CN | 109557666 | 4/2019 |
|---|---|---|
| CN | 110678799 | 1/2020 |
| CN | 107300770 | 5/2020 |
| EP | 3462228 | 4/2019 |
| EP | 3671318 | 6/2020 |
| JP | 2019124859 | 7/2019 |
| TW | 201439590 | 10/2014 |
| TW | 201502580 | 1/2015 |
| TW | 201945791 | 12/2019 |
| TW | I688790 | 3/2020 |
| WO | 2018165117 | 9/2018 |
| WO | 2019142431 | 7/2019 |
| WO | WO-2019142431 A1 * | 7/2019 |

OTHER PUBLICATIONS

"Search Report of Europe Counterpart Application", dated Jun. 16, 2021, pp. 1-7.
"Office Action of China Counterpart Application", dated Jul. 26, 2022, p. 1-p. 7.

* cited by examiner

NEAR-EYE LIGHT FIELD DISPLAY DEVICE

CROSS-REFERENCE TO RELATED APPLICATION

This application claims the priority benefit of China application serial no. 202010959076.2, filed on Sep. 14, 2020. The entirety of the above-mentioned patent application is hereby incorporated by reference herein and made a part of this specification.

BACKGROUND

Technical Field

This disclosure relates to a display device, and in particular to a near-eye light field display device.

Description of Related Art

With the advancement of display technology and demand for high technology by consumers, near-eye display (NED) and head-mounted display (HMD) are products with great development potential currently. Applications related to near-eye display technology can be divided into augmented reality (AR) technology and virtual reality (VR) technology currently. As a light field near-eye display (LFNED) has immediate light field information, it can address the vergence-accommodation conflict (VAC) issue, thereby providing image information having a depth, which can be used in the augmented reality technology and the virtual reality technology of the near-eye display technology.

In general, light field displays can be divided into two architectures, spatial multiplexing and time multiplexing. A time-multiplexed light field display uses a microelectromechanical element to change a position of a virtual image to adjust the clarity of front and rear scenes. A spatially multiplexed light field display uses a display element such as a micro light-emitting diode (micro-LED), a micro organic light-emitting diode (micro-OLED), and a liquid crystal display (LCD) to pass light field sub-images through an optical element such as a micro-lens array, and stack a parallax image on a retina, so that a user can view a light field image with a depth.

A single sub-image in a light field display image may be formed at a position of a human eye to form a human eye movement range, and when the same sub-image passes through an incorrect micro-lens array to form another human eye movement range, the image will be a noise image. Specifically, the micro-lens array will generate marginal rays due to its lens size, which will result in the formation of a larger human eye movement range. Therefore, an interference phenomenon of the human eye movement range will be generated, thereby reducing an available human eye movement range of the system. That is, when a position of the human eye pupil is located at an edge of the human eye movement range of the light field display, but not exceeding the human eye movement range. It can be known through experimental simulation that ghost images will still be generated, and it means that the human eye movement range will be shrank in a state of interference.

The information disclosed in this background section is only for enhancement of understanding of the background of the described technology and therefore it may contain information that does not form the prior art that is already known to a person of ordinary skill in the art. Furthermore, the information disclosed in the background section does not mean that one or more problems to be resolved by one or more embodiments of the disclosure were acknowledged by a person of ordinary skill in the art.

SUMMARY

This disclosure provides a near-eye light field display device, which can reduce interference of a human eye movement range between a main image and a ghost image, and increase a depth of field of an optical image.

Other objectives and advantages of the disclosure may be further understood from the technical features disclosed in the disclosure.

The disclosure provides the near-eye light field display device, which includes a display element, a micro-lens array, a first shielding element, and a second shielding element. The display element is configured to provide an image beam. The micro-lens array is located on a transmission path of the image beam. The micro-lens array has multiple micro-lenses connected to each other. The first shielding element is located between the display element and the micro-lens array, and the first shielding element includes multiple first shielding regions. The micro-lens array is located between the first shielding element and the second shielding element. The second shielding element includes multiple second shielding regions. The first shielding regions and the second shielding regions are located on the transmission path of the image beam passing through a junction of the micro-lenses, and a ratio of a diameter of the micro-lenses to a lens pitch of the micro-lens lenses is less than 0.8.

Based on the above, the embodiments of the disclosure have at least one of the following advantages or characteristics. In the near-eye light field display device of the disclosure, the near-eye light field display device includes the micro-lens array, and the first shielding element and the second shielding element disposed in front of and behind the micro-lens array. The first shielding element and the second shielding element respectively include the multiple first shielding regions and the multiple second shielding regions corresponding to the junction of the micro-lenses. Therefore, when multiple sub-display units of the display element respectively provide multiple sub-image beams to the corresponding micro-lenses, the shielding effect of the first shielding region and the second shielding region can be used to achieve a pinhole-like effect, thereby reducing the interference of the human eye movement range between the main image and the ghost image. In addition, an aperture value may be increased through the first shielding region and the second shielding region, further increasing an optical depth of field range, thereby enhancing a good depth display effect.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
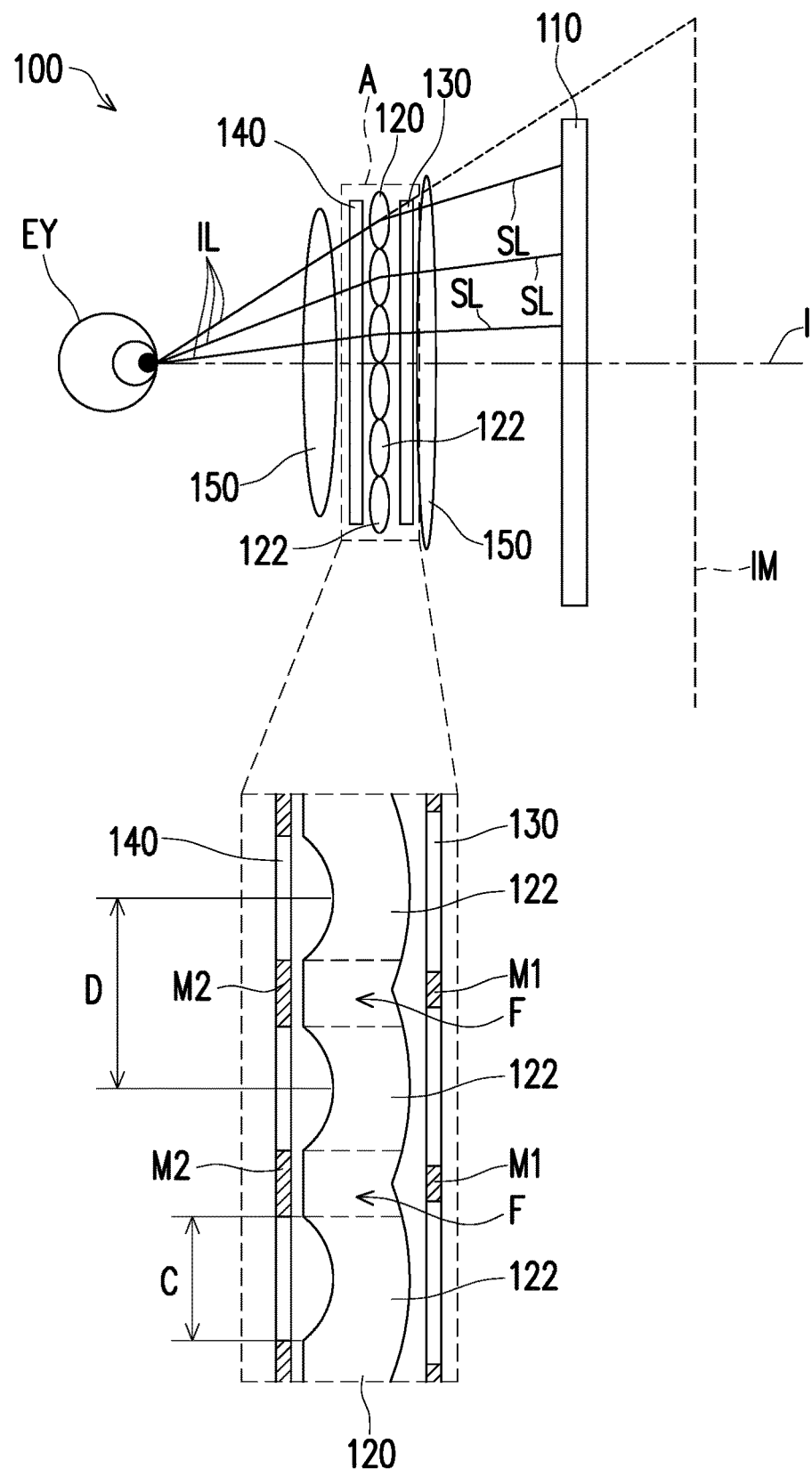
FIG. 1 is a schematic diagram of a near-eye light field display device according to an embodiment of the disclosure.

FIG. 1 is a schematic diagram of a near-eye light field display device according to an embodiment of the disclosure. With reference to FIG. 1, the embodiment provides a near-eye light field display device 100, which is configured to be disposed in front of at least one eye EY of a user. The near-eye light field display device 100 includes a display element 110, a micro-lens array 120, a first shielding element 130, and a second shielding element 140.

The display element 110 is configured to provide an image beam IL to the micro-lens array 120, the first shielding element 130, and the second shielding element 140. In the embodiment, the display element 110 is a light field display, which may be a micro light-emitting diode (Micro-LED) display, a micro organic light-emitting diode (Micro-OLED) display, and a liquid crystal display (LCD), but the disclosure is not limited thereto.

The micro-lens array 120 is located on a transmission path of the image beam IL to the eye EY. The micro-lens array 120 has multiple micro-lenses 122 connected to each other. Specifically, as shown in FIG. 1, in the embodiment, the display element 110 includes multiple sub-display units (not shown), which are respectively configured to provide multiple sub-image beams SL in the image beam IL. The multiple sub-image beams SL are respectively transmitted through the different micro-lenses 122 to generate light field information. Therefore, the image beam IL with the light field information formed by the multiple sub-image beams SL can produce a multi-focal plane effect in a three-dimensional space, so as to provide image information having a depth, and a parallax image may be formed by stacking through an optical effect on a retina of the user, allowing the user to view a light field image IM having a depth, but the disclosure is not limited thereto. In the embodiment, a diameter C of the multiple micro-lenses 122 is between 0.5 mm and 1.5 mm.

The first shielding element 130 is located between the display element 110 and the micro-lens array 120, and the second shielding element 140 is located between the micro-lens array 120 and the eye EY of the user. In other words, the micro-lens array 120 is located between the first shielding element 130 and the second shielding element 140. The first shielding element 130 includes multiple first shielding regions M1, and the second shielding element 140 includes multiple second shielding regions M2. The multiple first shielding regions M1 and the multiple second shielding regions M2 are located on the transmission path of the image beam IL passing through a junction F of the multiple micro-lenses 122, and a ratio of the diameter C of the micro-lenses 122 and a lens pitch D of the micro-lenses 122 is less than 0.8.

For example, in the embodiment, the first shielding element 130 and the second shielding element 140 are thin transparent sheets. The first shielding regions M1 and the second shielding regions M2 are non-transparent regions in the thin transparent sheets, composed of, for example, a black material or a light-absorbing material. In addition, in the embodiment, an area of the first shielding region M1 perpendicular to an optical axis I of the near-eye light field display device 100 is smaller than an area of the second shielding region M2 perpendicular to the optical axis I. Therefore, when the multiple sub-image beams SL are respectively transmitted through the different micro-lenses 122, a shielding effect of the first shielding regions M1 and the second shielding regions M2 may reduce interference of a human eye movement range between a main image and a ghost image. In addition, since the embodiment may increase an aperture value through the first shielding region M1 and the second shielding region M2, an optical depth of field range can be further increased to achieve a pinhole-like effect, thereby enhancing a good depth display effect.

In the embodiment, the near-eye light field display device 100 further includes two lens elements 150. The micro-lens array 120, the first shielding element 130, and the second shielding element 140 are disposed between the two lens elements 150. The two lens elements 150 may be plano-convex lenses or bi-convex lenses, and may even be aspheric lenses, but the disclosure is not limited thereto. In the embodiment, the near-eye light field display device 100 may adjust relevant optical parameters of different optical elements, thereby further reducing aberrations and enhancing an imaging quality of the light field image.

Figure 2A:
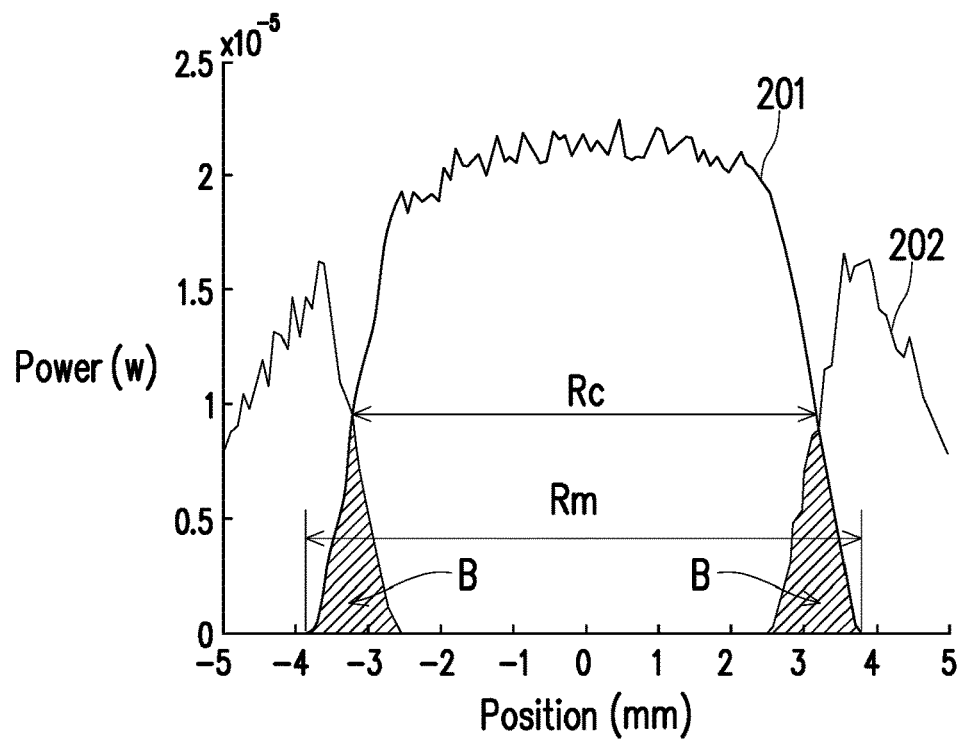
FIGS. 2A and 2B are respectively light intensity distribution diagrams of the near-eye light field display device at a position of a human eye according to different embodiments.
Figure 2B:
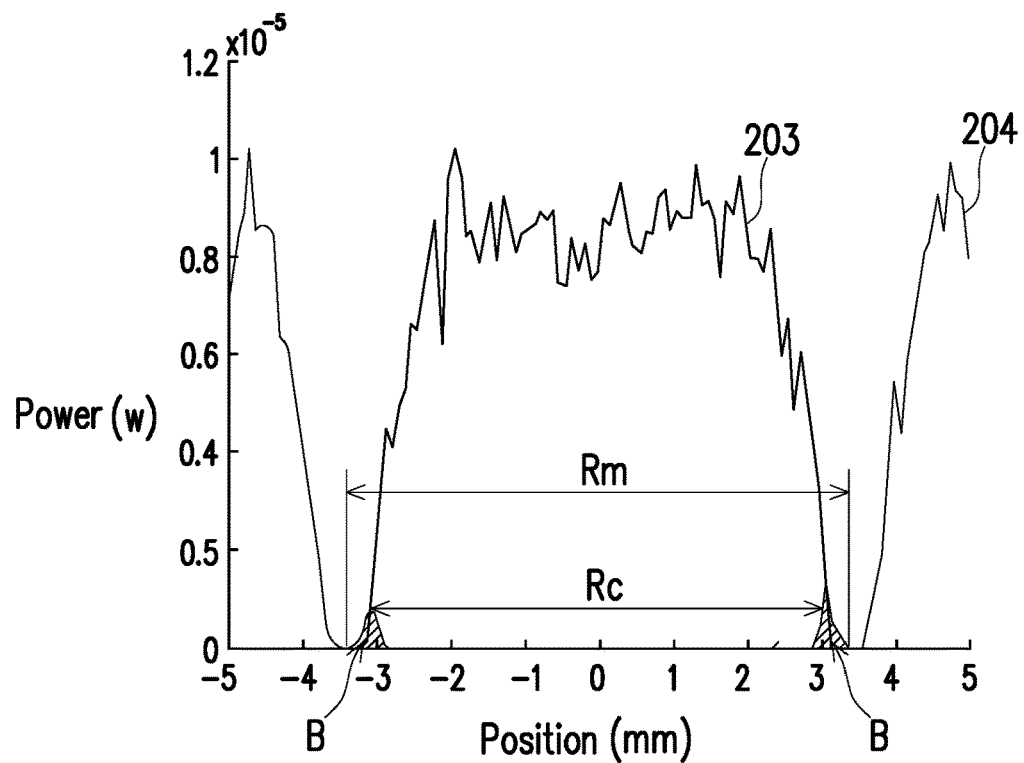

FIGS. 2A and 2B are respectively light intensity distribution diagrams of the near-eye light field display device at a position of a human eye according to different embodiments. With reference to FIGS. 1 to 2B, FIG. 2A corresponds to a traditional near-eye light field display device, which does not has the disposition of the first shielding element 130 and the second shielding element 140 as shown in FIG. 1, and FIG. 2B corresponds to the near-eye light field display device 100 as shown in FIG. 1. Curves 201 and 203 respectively represent light intensities of a correct path of light in different human eye movement ranges according to different embodiments. Curves 202 and 204 respectively represent light intensities of an incorrect path of light (that is, stray light) in different human eye movement ranges according to different embodiments. Therefore, in the embodiment of FIG. 2A, the diameter C of the micro-lenses 122 is larger, which will cause a difference between a marginal light human eye movement range Rm and a chief light human eye movement range Rc to be too large, thereby resulting in a larger human eye interference range B. In the embodiment of FIG. 2B, the diameter C of the micro-lenses 122 is between 0.5 mm and 1.5 mm. Therefore, the difference between the marginal ray human eye movement range Rm and the chief ray human eye movement range Rc will be reduced, thereby reducing the human eye interference range B.

Figure 3:
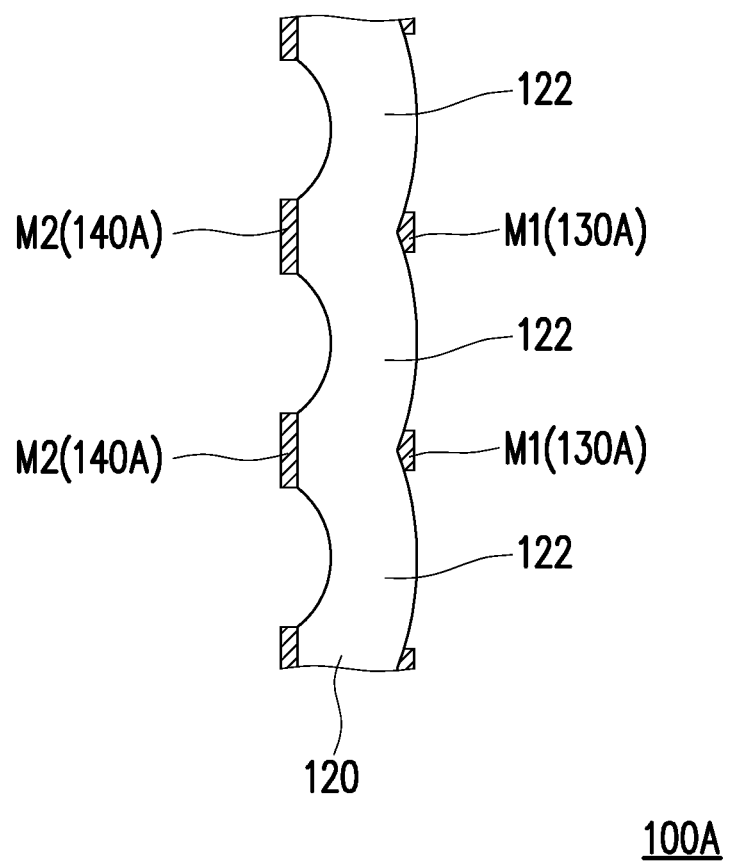
FIG. 3 is a schematic diagram according to another embodiment in comparison to an area A shown in FIG. 1.

FIG. 3 is a schematic diagram of a part of the near-eye light field display device according to another embodiment in comparison to an area A shown in FIG. 1. A near-eye light field display device 100A shown in the embodiment is similar to the near-eye light field display device 100 shown in FIG. 1. A difference between the two is that, in the embodiment, a first shielding element 130A and a second shielding element 140A are different from the first shielding element 130 and the second shielding element 140 in FIG. 1. In detail, in the embodiment, the first shielding element 130A and the second shielding element 140A are designed as opaque coatings on a surface of the micro-lens array 120, formed by spraying of dye or photolithography. In this way, disposition of an additional optical element may be omitted, and an optical error generated during disposition of different optical elements may be avoided. Therefore, when the multiple sub-image beams SL are respectively transmitted through the different micro-lenses 122, the shielding effect of the first shielding region M1 and the second shielding region M2 can be used to achieve a pinhole-like effect, thereby reducing the interference of the human eye movement range between the main image and the ghost image. In addition, since the embodiment may increase the aperture value through the first shielding region M1 and the second shielding region M2, the optical depth of field range can be further increased, thereby enhancing a good depth display effect.

In summary, in the near-eye light field display device of the disclosure, the near-eye light field display device includes the micro-lens array, and the first shielding element and the second shielding element which are disposed in front of and behind of the micro-lens array. The first shielding element and the second shielding element respectively include the first shielding regions and the second shielding regions corresponding to the junction of the micro-lenses. Therefore, when the multiple sub-display units of the display element respectively provide the multiple sub-image beams to the corresponding micro-lenses, the shielding effect of the first shielding region and the second shielding region can reduce the interference of the human eye movement range between the main image and the ghost image. In addition, the first shielding regions and the second shielding regions may increase the aperture value to achieve a pinhole-like effect, and further increase the optical depth of field, thereby enhancing a good depth display effect.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Furthermore, the terms such as "first" and "second" mentioned in this specification or the appended claims are used to name different elements or to distinguish between different embodiments or ranges, and are not intended to limit the upper or lower limit of the number of elements. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A near-eye light field display device, comprising a display element, a micro-lens array, a first shielding element, and a second shielding element, wherein
   the display element is configured to provide an image beam;
   the micro-lens array is located on a transmission path of the image beam, and the micro-lens array has a plurality of micro-lenses connected to each other;
   the first shielding element is located between the display element and the micro-lens array, and the first shielding element comprises a plurality of first shielding regions; and the micro-lens array is located between the first shielding element and the second shielding element, the second shielding element comprises a plurality of second shielding regions, the plurality of first shielding regions and the plurality of second shielding regions are located on the transmission path of the image beam passing through a junction of the plurality of micro-lenses, and a ratio of a diameter of the plurality of micro-lenses and a lens pitch of the plurality of micro-lenses is less than 0.8.

2. The near-eye light field display device according to claim 1, wherein the first shielding element and the second shielding element are thin transparent sheets.

3. The near-eye light field display device according to claim 2, wherein the plurality of first shielding regions and the plurality of second shielding regions are non-transparent regions in the thin transparent sheets.

4. The near-eye light field display device according to claim 1, wherein the first shielding element and the second shielding element are optical coatings on a surface of the micro-lens array.

5. The near-eye light field display device according to claim 1, wherein the plurality of first shielding regions and the plurality of second shielding regions are opaque coatings.

6. The near-eye light field display device according to claim 1, wherein the diameter of the plurality of micro-lenses is between 0.5 mm and 1.5 mm.

7. The near-eye light field display device according to claim 1, wherein an area of the plurality of first shielding regions perpendicular to an optical axis of the near-eye light field display device is smaller than an area of the plurality of second shielding regions perpendicular to the optical axis.

8. The near-eye light field display device according to claim 1, further comprising:
    two lens elements, wherein the micro-lens array, the first shielding element and the second shielding element are disposed between the two lens elements.

9. A near-eye light field display device, comprising a display element, a micro-lens array, a first shielding element, and a second shielding element, wherein
    the display element is configured to provide an image beam;
    the micro-lens array is located on a transmission path of the image beam, and the micro-lens array has a plurality of micro-lenses connected to each other;
    the first shielding element is located between the display element and the micro-lens array, and the first shielding element comprises a plurality of first shielding regions;
    the micro-lens array is located between the first shielding element and the second shielding element, the second shielding element comprises a plurality of second shielding regions; and
    the diameter of the plurality of micro-lenses is between 0.5 mm and 1.5 mm.

* * * * *